April 18, 1961 H. A. SKOG 2,980,232
FRUIT ORIENTING MACHINE
Filed Dec. 2, 1948 7 Sheets-Sheet 4

INVENTOR.
Henry A. Skog
BY Moore, Olson & Trexler
attys.

Patented Apr. 18, 1961

2,980,232

FRUIT ORIENTING MACHINE

Henry A. Skog, Olympia, Wash., assignor, by mesne assignments, to Food Machinery and Chemical Corporation, San Jose, Calif., a corporation of Delaware Filed Dec. 2, 1948, Ser. No. 64,022

26 Claims. (Cl. 198—33)

This invention relates to a fruit orientator method and machine and more particularly to a method and machine for orienting peaches or like fruit.

Among the objects of the present invention are to provide a means for orienting fruits or vegetables having a stem indent, wherein a plurality of fruit turning or rotating means are provided each shaped frictionally to contact the curved surface of the whole fruit or vegetable to turn it about its center and wherein one of the turning means is shaped to enter the indent of the fruit or vegetable to orientate the stem indent; to provide an orienting method of turning a whole fruit relative to a stem indent engaging means to orient the suture plane of the fruit and thereafter turning the fruit by turning of the indent engaging means to position the suture plane in a predetermined direction; to provide a means and method of progressively turning a fruit or vegetable having a stem indent about a constantly shifting axis of rotation; to provide a means and method of maintaining a whole fruit or vegetable supported upon a plurality of spaced rotatable fruit turning means constructed and arranged to cause the whole fruit to turn about a plurality of axes simultaneously and to cause one of said turning means to enter the stem indent and other turning means thereafter to cause said fruit to be turned relatively to one turning means to cause said latter member to register with the suture plane of the fruit to so orientate the fruit; to provide at least three spaced fruit turning means on which the fruit is jointly supported, the arrangement being such that initially all three of said members rotate the fruit to orientate the stem indent and thereafter only two of said members turn the fruit to cause the third member to enter the stem indent and register with the suture plane.

Yet another object of the invention resides in providing a plurality of rotative means having peripheral portions shaped simultaneously and conjointly to turn the fruit first to orientate the stem indent of the whole fruit and thereafter to orientate the suture plane indent without shifting said rotative means angularly and bodily about and relative to their own axes of turning.

Another object of the invention resides in providing means for supporting a fruit having a stem indent upon a rotating means having a peripheral portion shaped to enter the stem indent and constructed to rotate the fruit about progressively changing axes of rotation to cause the stem indent to overlie the so shaped peripheral portion and to provide in conjunction therewith other means for rotating the fruit supported solely upon said rotating means whereby to orientate not only the stem indent but also the suture plane of the fruit or vegetable.

Another object of the invention is to provide means operative while the fruit is being oriented for vibrating a rotatable peripherally shaped means adapted to enter the stem indent whereby to cause the same more fully and more effectively and completely to enter within and lie parallel within the stem indent to effect complete suture plane orientation.

Another object of the present invention is to orient the suture plane of a whole peach by imparting a gyroscopic turning movement to the peach while the peach is in rolling contact with an orienting member having a peripheral portion shaped to the contour of the indent along the suture plane of the peach, whereby to cause the suture plane of the peach to register with the correspondingly shaped peripheral portion of the rotatable member.

Yet another object of the invention is to provide means for orienting a peach on a rotatable peach supporting wheel without turning the wheel angularly about an axis normal to its axis of rotation.

Another object of the invention is to provide a three point rolling support during the orienting operation.

Another object of the invention is to provide in a peach orienting device including shiftable members confining the peach on an orienting wheel or sensing member, means carried by one of the peach confining members for positioning the peach with the center of gravity of the peach lying on one side of the plane of the wheel or sensing member.

Another object of the invention is to provide a peach orienting machine embodying a continuously rotating peach carrier, an orienting wheel carried by said carrier, means for feeding a peach onto the wheel for movement continuously with the carrier and superimposed on the wheel, means for maintaining that wheel in a fixed plane with respect to the axis of rotation of the carrier during the orienting of the peach by the wheel, means for rotating the peach continuously during the continuous rotation of the carrier and relative to the orienting wheel to align the suture plane of the peach with the wheel, and means for thereafter turning the wheel with respect to the axis of rotation of the carrier to effect a predetermined positioning of the suture plane of the peach relative to the axis of rotation of the carrier to facilitate transfer of the peach from the orienting wheel.

These and other objects of the invention will be apparent from a perusal of the following specification when taken in connection with the accompanying drawings, wherein.

The drawings illustrate a preferred form of machine for carrying out the process disclosed herein. As shown in Figures 1 to 7, the drawings comprise a machine frame having side plates 2 and 4 spaced apart by a plurality of cross members such as the cross members 6 and 8, and others not shown, angle irons 10 and 12 extend longitudinally of the side plates 2 and 4 at the upper ends thereof, and other like angle irons, not shown, extend longitudinally to form supporting feet for the machine frame. A stationary supporting column or shaft 14 is secured in the boss 16 in the cross member 6, see Figure 4, and also in a like boss of a similar cross member not shown, positioned near the bottom of the machine frame.

Figure 1:
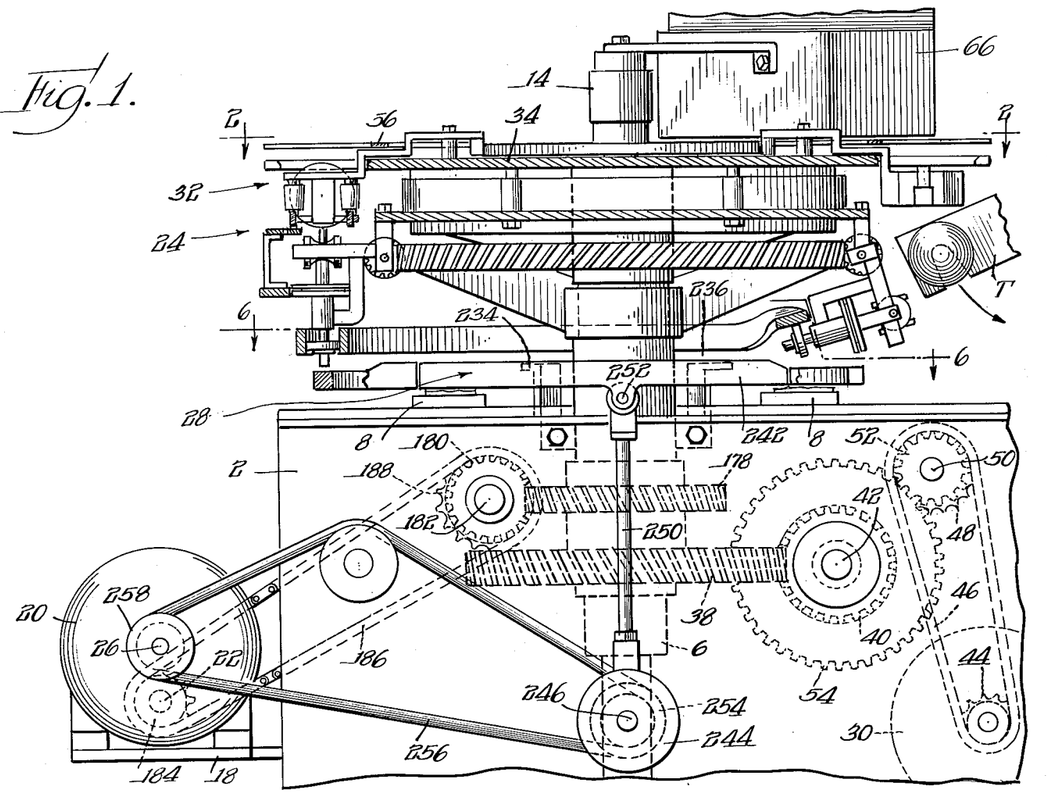
Figure 1 is a side elevational view of the machine with the upper portions shown in section.

As shown in Figure 1 a platform 18 mounted in any convenient manner upon the side plates 2 and 4 supports a combined motor and speed reducer 20 which has a slow speed shaft 22 which drives a plurality of orienting mechanisms generally indicated by numeral 24 in Figure 1. The motor and speed reducer 20 also include a high speed shaft 26 which drives a fruit vibrator mechanism indicated in general by the pointed arrow 28 of Figure 1. A second motor 30, see Figure 1, which may if desired be mounted in any convenient manner upon a platform, not shown, secured to one or both of the side plates 2 and 4, drives a fruit conveyor means or turret indicated in Figure 1 by the arrow 32, simultaneously causes the orienting mechanism 24 to travel with the fruit conveying means or turret 32.

Figures 2, 3:
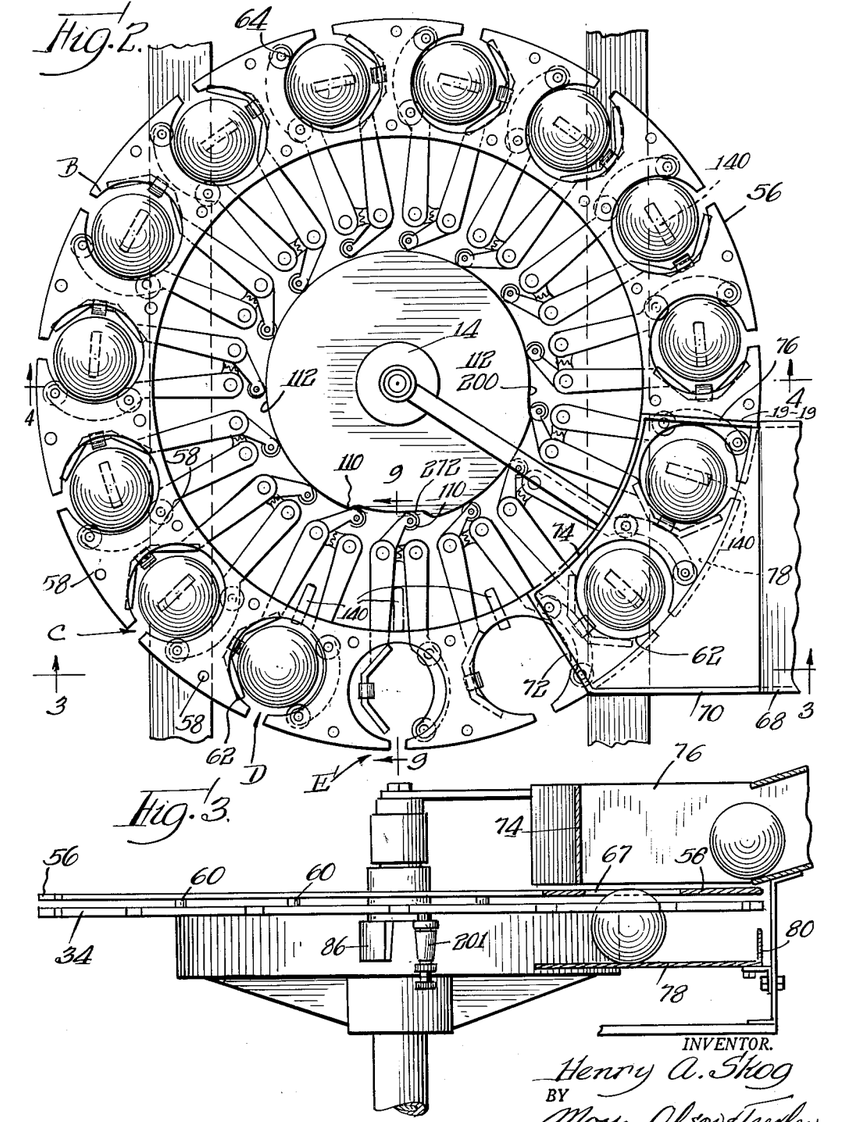
Figure 2 is a plan view of the machine.
Figure 3 is a sectional view taken on the line 3—3 of Figure 2.
Figure 4:
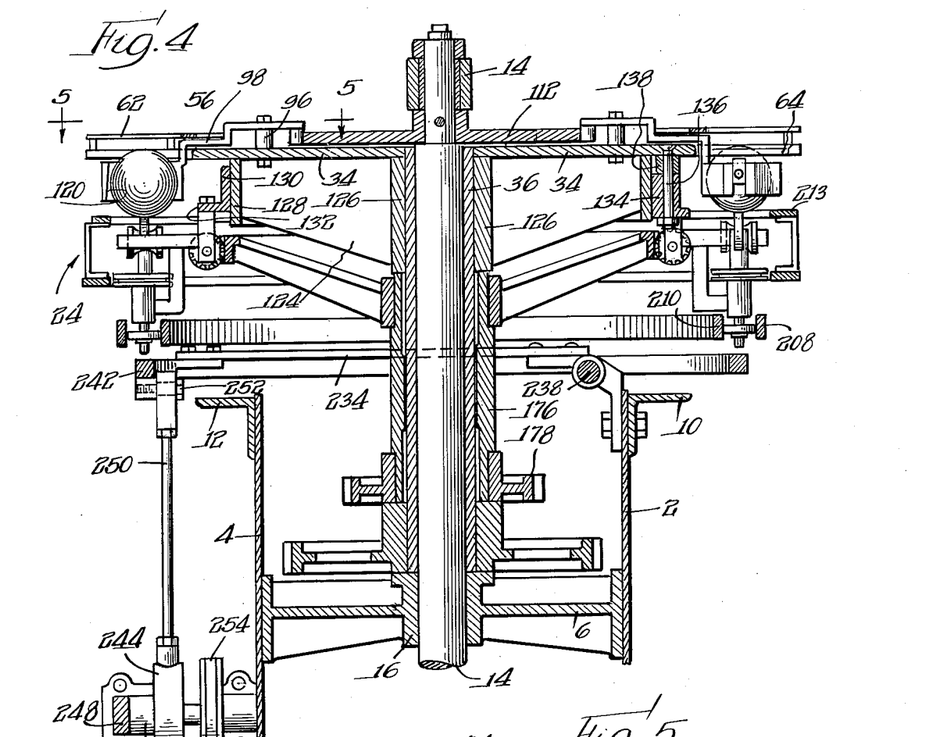
Figure 4 is a sectional view taken on the line 4—4 of Figure 2.

The fruit conveying means 32, as shown in Figures 1 and 3 to 5, comprises a ring turret or disk 34 keyed to a sleeve 36, see Figure 4, journalled on the column or shaft 14. The sleeve 36 is keyed at its lower end to a spiral gear 38 driven by a spiral pinion 40 secured to a cross shaft 42 journalled in suitable brackets, not shown, fastened to the side plates 2 and 4. This shaft 42 is driven by the motor 30 by means of a sprocket 44 on the motor shaft, a chain 46, a sprocket 48 on the cross shaft 50 carrying a gear 52 meshing with a gear 54 on the shaft 42. A ring 56, see Figures 2 and 3, is mounted in vertically spaced relation on the main turret disk 34 as by fastening means 58 and spacing sleeve 60.

The ring 56 overlies the rim of the main turret disk 34 as illustrated in Figures 1 to 5, and is provided with a plurality, namely fifteen, apertures 62 preferably circular and of a diameter sufficient to permit ready passage of peaches of a large size which it is desired to orient by means of the machine. The openings 62 are equally and arcuately spaced around the ring 56. The main turret disc 34 is provided with a similar series of openings or apertures 64, see Figure 4, also equally and arcuately spaced around the disk and vertically aligned with the apertures 62 in the ring 36. Fruit is fed to the ring 56 and the turret disk 34 from a hopper 66, see Figure 1, or other bulk container, or from a suitable bulk conveyor from which the peaches roll down a chute 68, see Figure 3, having above the ring 56 and the turret disk 34 an open bottom or arcuate slot and side walls 70, 72, 74, 76, see Figures 2 and 3. The open bottom or arcuate slot in the bottom of this chute allows the peach to roll from the chute 68 onto the surface of the ring 56, and hence to fall through one of the openings 62 as it passes between the side walls 72 and 76, and therefrom to pass through an opening 64, see Figure 4, in the main turret disk onto an arcuate plate 78 having an arcuate wall 80 and in the fruit receiving or holding means hereinafter described end of which there are a plurality of sets corresponding to the number of openings in the ring 56 and on the main turret disk 34.

As best seen in Figures 2, 5, 12 and 16, each fruit receiving or fruit centering means includes a generally V-shaped clamp 86 and an opposed clamp or centering member 88. These two centering and clamping members 86 and 88 are formed integrally with arms 90 and 92 mounted by pivot bolts 94, see Figure 5, and spacing sleeves 96, see Figure 4, on the main turret disk 34. These arms 90 and 92 are provided with downwardly offset portions 98 which pass between the ring 56, see Figure 4, and are also formed with further depending portions 100 joining the centering members 86 and 88 with the arms 90. These connecting portions 100 pass through the openings formed in the turret member 34. By reference to Figures 2 and 5 it will be seen that the openings 64 in the turret disk are formed with slots 102 and 103, see Figure 5, to receive the depending portions 100 when the centering members 86 and 88 are moved to full opened position. Arms 90 and 92 are formed with interengaging teeth or gear segments 104 and 106 to cause the arms 90 and 92 to move simultaneously in the opposite directions when the arm 90 is actuated.

Figure 5:
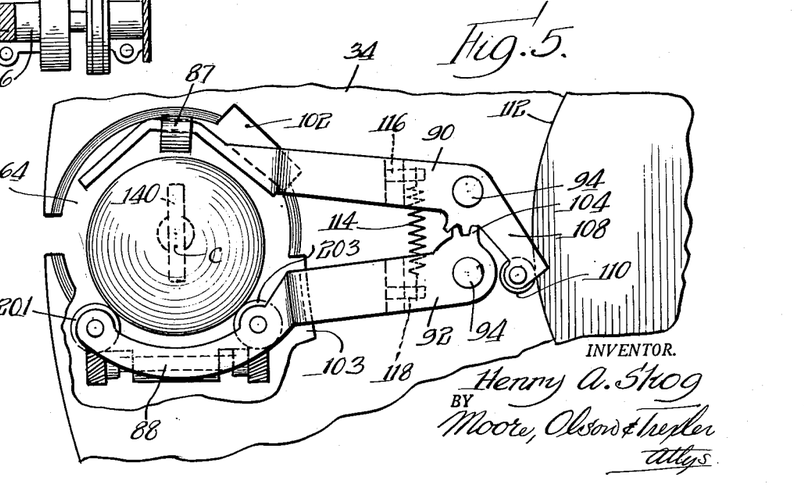
Figure 5 is a detail plan sectional view taken on the line 5—5 of Figure 4.
Figure 17:
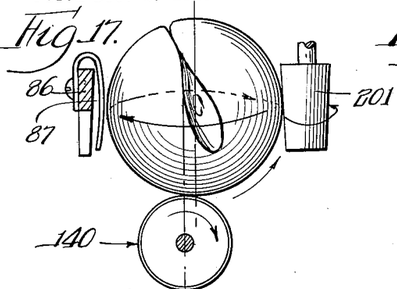
Figures 17 to 23 are diagrammatic views of the fruit in various positions of being oriented.

The arm 90 is provided with an integral arm portion 108 extending inwardly from the mounting or pivot bolt 94 and provided at its inner end with a cam follower or roller 110 riding upon the surface of a circular cam 112, see Figures 2 and 5, pinned to the upper end of the stationary column or shaft 14. The arms 90 and 92 are interconnected and urged together by a spring 114 secured at one end to a pin 116 carried by the arm 90 and the other end to a pin 118 carried by the arm 92. The spring 114 therefore urges the centering members 86 and 88 to closed position and they are moved to open position by the stationary cam 112 as the grippers move about their circular path with the turret disk 34. The inner surface 120 of one of these centering members, to-wit 86, is inclined or tapered, see Figure 4, for the purpose which will presently appear. The V-shaped character or formation of the centering member 86 enables this member 86 to centralize and push a fruit against both of the driving rollers 201 and 203 carried by the opposed centering member 88, as will be hereinafter described. In this position, as shown in Figure 17, the center of gravity of the fruit lies to the right of the center of the orienting wheel, as hereinafter described.

As shown in Figure 4, the top turret is generally in the form of a wheel-like member 124 and has a central hub portion 126 surrounding the sleeve 36 and has a ring flange 128 abutting and depending from the turret disk 34. The spider-like member 124 is secured to the sleeve 36 or to the disk 34 for rotation together. A ring 130 having an annular flange 132, see Figure 13, at its lower end and is mounted on a ring flange 128, see Figure 8, and forms a mounting for the orienting mechanism hereinbefore referred to generally as 24 in Figure 4. As hereinbefore stated, these orienting mechanisms are equal in number to the number of openings, namely fifteen, in the ring 56 and the main turret disk 34. The ring 130 is provided with annularly spaced, axially extending bosses 134, see Figure 4, receiving mounting bolts 136 by which the ring is adjustably secured to the turret disk 34. A spacing member or members 138 is interposed between the turret disk 34 and the bosses 134 to adjust the orienting mechanism vertically with respect to the turret disk 34 and the fruit centering means 86 and 88. The adjustment is accomplished by substituting for the spacing member or members 138 a like member or members of different thickness.

Figure 9:
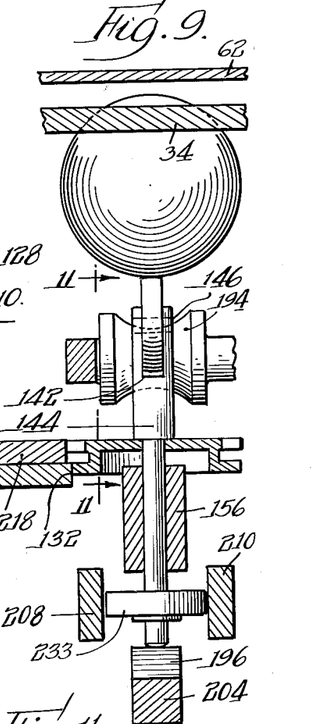
Figure 9 is a similar view to Figure 8, showing the parts at a different position.
Figure 12:
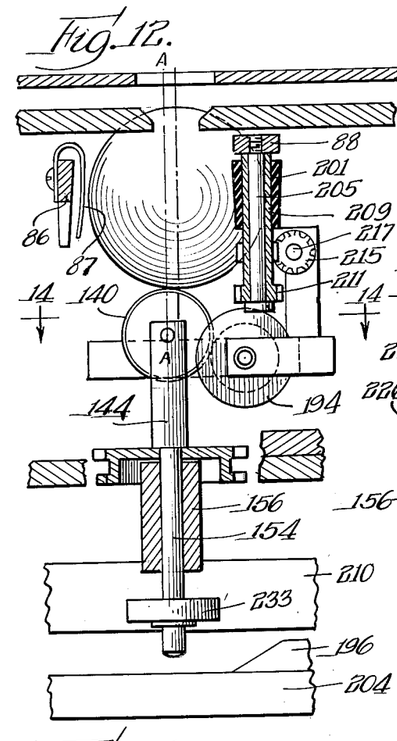
Figure 12 is a vertical sectional view taken on the line 12—12 of Figure 8.
Figures 13, 16:
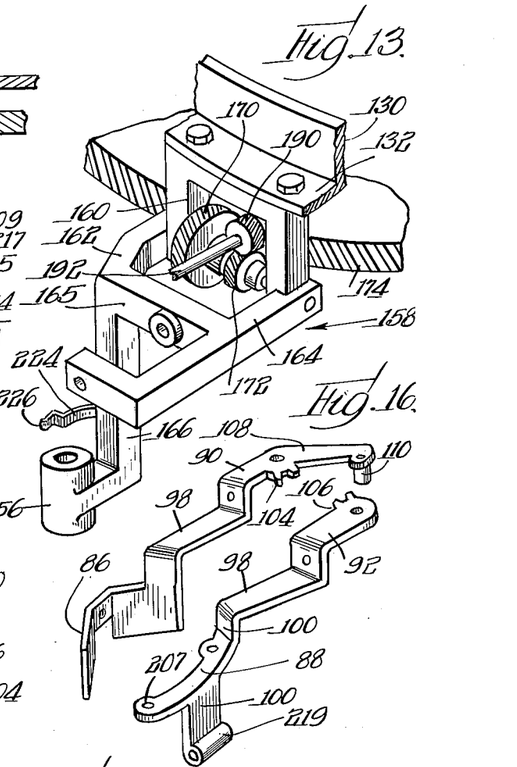
Figure 13 is a perspective view of a portion of the machine, showing in detail one of the devices for orienting.
Figure 16 is a perspective view of the clamping jaws.

Each orienting mechanism for a peach or other fruit comprises a rotatably driven orienting member or wheel 140 which is relatively small in diameter, for example from 1⅜ inches to 1¾ inches, in relation to the size of the peach or other like fruit. As shown in Figure 12, the whole peach is adapted to be superimposed upon, so as to rest upon, the wheel 140. The wheel 140 is positioned within a slot 142, see Figure 9, of a spindle 144 and journalled on a cross pin 146 press fitted or otherwise secured to the spindle 144. A Geneva gear 148 and a Geneva lock plate 150 are secured to the spindle 144. The Geneva lock plate 150 has four equal arcuate locking surfaces 152. The reduced lower portion 154 of the spindle is journalled in an apertured boss 156 of a supporting unit 158. As seen in Figure 13, this supporting unit may comprise a U-shaped upper bracket 160 bolted to the annular flange 132 of the annular ring 130. Bracket 160 has secured to its spaced arms or bars 162 and 164 of the supporting unit 158 to which is secured or with which is integrally formed a bracket 166 providing the vertical spindle journal boss 156. Depending arms of the bracket 160 also form the mounting support and journals for a shaft 168, to which is secured a spiral pinion 170 and a gear 172.

The spiral pinion 170 meshes with and is rotated by a large spiral gear 174 keyed to the sleeve 176 concentric with the column or shaft 14. The sleeve 176 has keyed to its lower end a spiral gear 178 driven by a suitable pinion 180 on a shaft 182 journalled in suitable bearing brackets, not shown, secured to the side plates 2 and 4. The shaft 182 is driven by the slow speed shaft 22 of the combined motor and speed reducer 18 as by means of a sprocket 184 on the shaft 22, a chain 186, and a sprocket 188 on the shaft 182.

Figure 6:
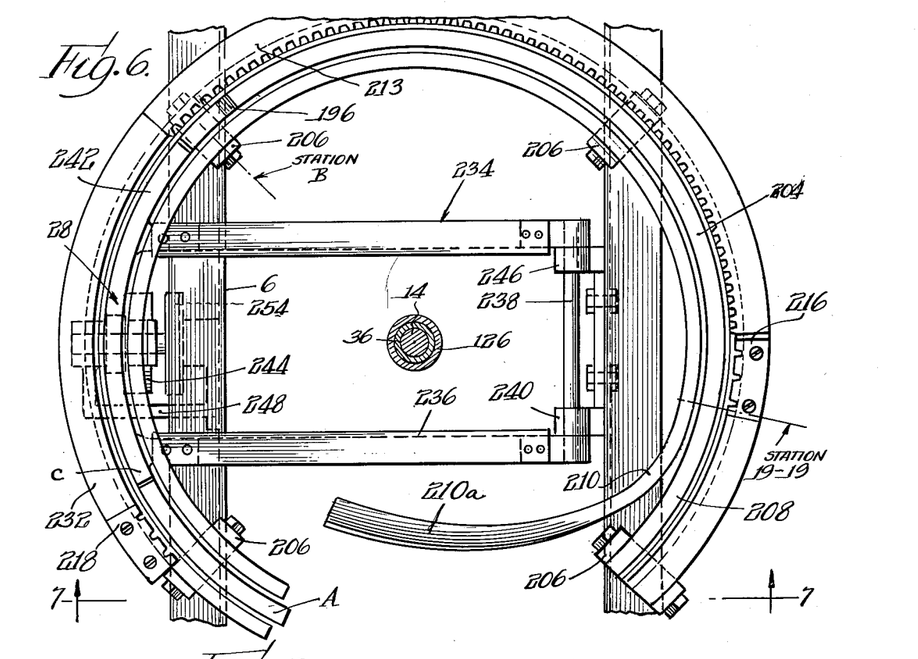
Figure 6 is a sectional plan view taken on the line 6—6 of Figure 1.
Figure 7:
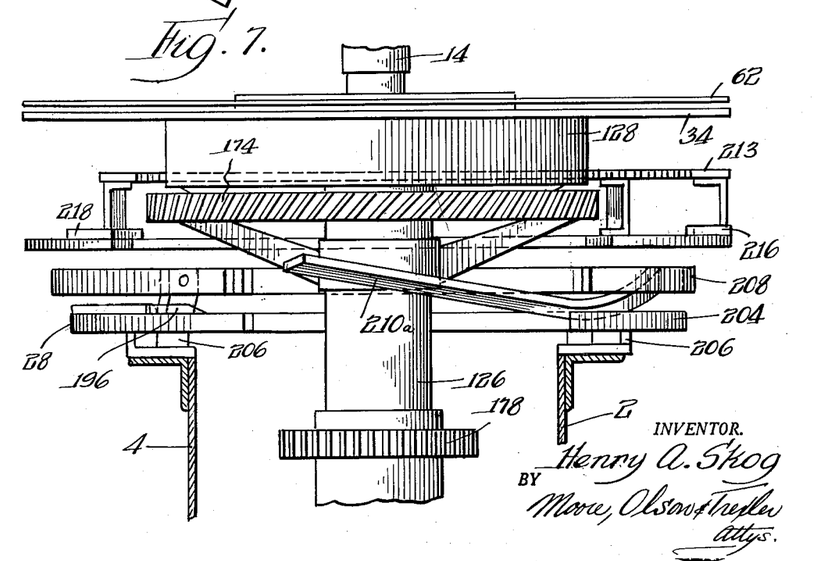
Figure 7 is a vertical sectional view taken on the line 7—7 of Figure 6.
Figure 8:
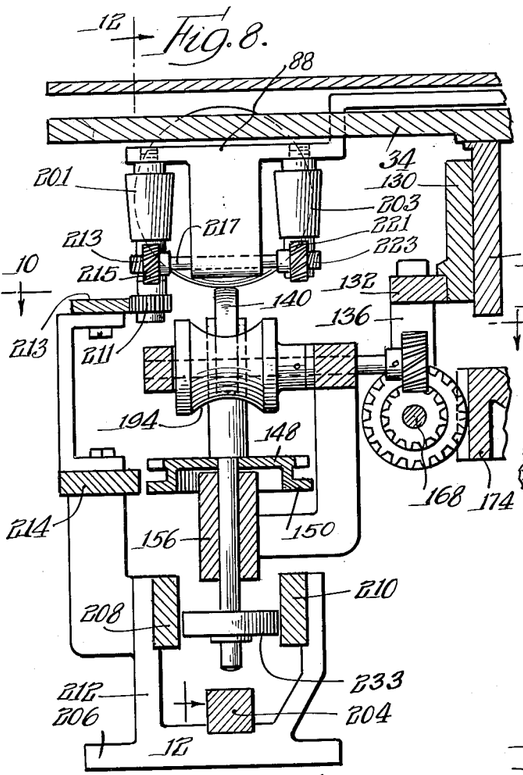
Figure 8 is a detail sectional view taken on the line 8—8 of Figure 5.
Figures 10, 11:
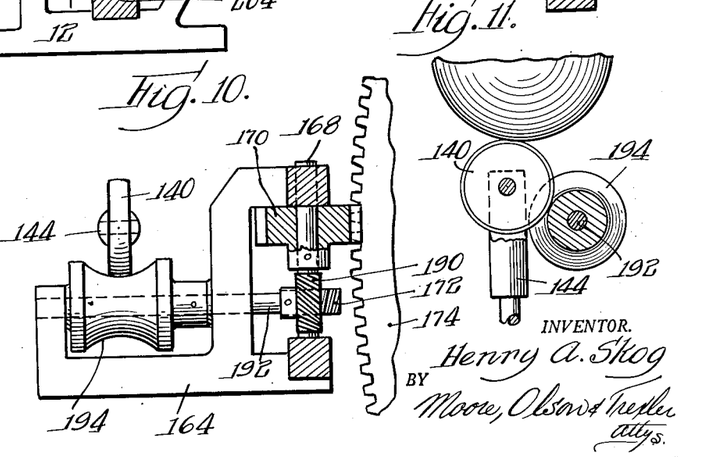
Figure 10 is a plan sectional view taken on the line 10—10 of Figure 8.
Figure 11 is a vertical sectional view taken on the line 11—11 of Figure 9.
Figure 14:
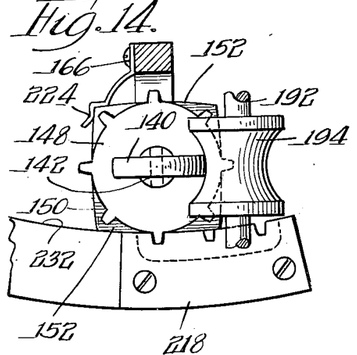
Figure 14 is a plan sectional view taken on the line 14—14 of Figure 12.
Figure 15:
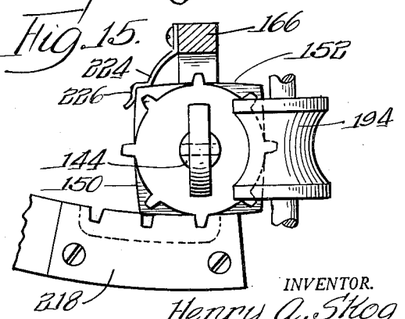
Figure 15 is a view corresponding to Figure 14 but showing the parts in changed position.

Gear 172, Figure 10, meshes with the gear 190 secured to a shaft 192 journalled in the cross arms 165. A drive spool 194 of hourglass form is secured to the shaft 192 for rotation thereby and its concave surface which is concentric to the axis of rotation of the orienting wheel 140 when the wheel contacts the driving spool is adapted frictionally to rotate the orienting wheel 140. It should be noted that the horizontal distance between the vertical planes through the axes of rotation of the driving spool 194 and the wheel 140 is less than the sum of the radius of the wheel and the spool when the wheel is perpendicular to the spool axis and that the horizontal planes through the respective axes are vertically spaced so that the orientating wheel engages the surface of the driving spool at a point above the horizontal plane through the spool axis. This permits the orienting wheel to be raised out of driving engagement with the drive spool 194 just prior to its passage onto a vibrating sector, as hereinafter referred to. The spindle 144 of the orienting mechanism is of such length that the bottom end of its reduced portion 154 terminates above the mounting ring 204 as illustrated in Figure 12. When the spindle is carried, by the turning of the turret, to the cam block 196, the lower end of the spindle engages the leading bevelled end of the cam block and is thereby raised as illustrated in Figure 12. Circular guide means for the spindles of the plurality of orienting mechanisms as they are revolved by the turret about the axis of the column or shaft is provided by a pair of circular tracks or rings 208 or 210, as best seen in Figures 1, 4, 6 and 8. These rings are mounted on spaced vertical arms 212 of the brackets 206, see Figure 8. The outer arm of the bracket 206 also supports in vertical spaced relation to the track 208 a Geneva lock ring 214, as seen in Figures 8, 14 and 15. The Geneva movement actuating or driving gear sectors 216 and 218, see Figure 6, are each provided with two teeth on its inner surface to engage the teeth of each Geneva gear 148 as the orientating mechanisms are brought thereto by the rotation of the turret. The two teeth of each Geneva driving gear sector cause the spindle of each orientating mechanism to be rotated through an angle of ninety degrees. Means is provided for holding each spindle from accidental rotation around a vertical axis. This means preferably comprises a flat spring 224, see Figures 14 and 15, secured to the upstanding arm 166 of the bracket 158 and is provided with a V-shaped hook 226 at its outer end to engage a corner of the Geneva lock plate 150 and thereby prevent accidental rotation of the spindle 144.

It will of course be evident that the locking surface 152 of the locking plates, see Figures 14 and 15, has the same radius as the locking edge 232, see Figure 14, of the locking ring, and thereby the locking plates will be held against any rotation during the travel around a circular path during operation of the machine.

As the turret rotates the peach between any pair of grippers 86 and 88 the fruit is being conveyed and orientated as to stem indent and as to suture plane, or the long axis of the stem indent.

Rotatable roller means is provided to cooperate with the orientating roller 140 for turning the whole fruit in a horizontal plane. This means comprises in the present instance a pair of spaced rollers 201 and 203. These rollers are mounted on a shaft or pin 205 threaded at its end in one of the holes 207 of the jaw member 88, see Figures 12 and 13. Surrounding the pin is a sleeve 209 on the lower end of which sleeve is keyed a gear pinion 211 which is adapted to mesh with an arcuate rack 213, see Figure 6, when the jaw carrying this roller and this gear 211 travels opposite the zone of action of the rack 213 whereby to rotate the sleeve 209. The rubber roller 201 makes a tight fit with the outer surface of the sleeve 209 and may be adhered or otherwise affixed to it in any desired manner. The sleeve 209 carries a small gear 213 which engages a transversely disposed gear 215 on a shaft 217 having a bearing in a sleevelike member 219 carried by the lower end of the depending member 100 on the jaw member 88, see Figure 16. The upper end of the shaft carries a similar gear 221 which meshes with another gear 223 which drives the roller 203 which is similar in construction and mounting to the roller 201, both rollers being mounted on the depending lug 100 on the arm 88, see Figure 16.

It will be noted from an inspection of Figures 12 and 17 to 23 that the central axis of the orientating roller 140 is offset on the line A, as shown in Figure 12. Also by reference to Figure 5 it will be seen that the center of the orientating roll 140 is located laterally of the center C of the peach and the centers of the two rollers 201 and 203 are shown such that these vertical rolls are contacting the periphery of the peach in the manner indicated in Figures 17 to 23. By reference to Figures 16 and 12 it will be seen that the jaw 86 carries a leaf spring 87 which is arranged so that it presses inwardly against the outer face of the curvature of the peach as shown in Figure 12.

After the fruit has been carried past position or station B, see Figure 6, the orienting wheel may, for one reason or another, not be fully seated to its maximum depth in the stem indent, or in some few instances, the wheel may be slightly cocked with respect to the long axis of the stem indent. In order to cause the wheel to enter into the deepest position of the cavity, applicant has provided the vibrating mechanism 28. This vibrating mechanism 28, best shown in Figures 1, 6 and 7, comprises a pair of frame bars 234 and 236 pivoted at their inner ends on a common shaft 238 held in brackets 240 and 246 bolted to the side frame plate 2. The track or ring 204 which supports the spindle raising blocks 196, 198, 200 and 202 is cut away between a pair of brackets 206 and an arcuate ring 242 of the same radius as the ring 204 is bolted to the outer ends of the arms 234 and 236 of the vibrating mechanism and bridges the gap between the ends of the ring 204. The arcuate ring 242 is vibrated, substantially vertically, by an eccentric 244 secured to a shaft 246 mounted on a suitable bracket 248 bolted to the side frame plate 4. A connecting rod 250 connects the eccentric 244 to a pivoted stud 252 bolted to the ring sector 242. The shaft 246 is provided with a pulley 254, driven by belt 256, in turn driven by a speed adjustable pulley 258 on high speed shaft 26.

*Operation*

The operation of the machine to accomplish rotation of peaches or the like as to indent and suture plane is as follows: The peaches are dumped or delivered into the hopper or chute 68 and roll down the chute, passing from the chute onto the surface of the continuously rotating ring 56, the peaches being confined against any substantial arcuate movement by the upstanding side walls 70, 72, 74 and 76 of the chute or hopper. As each opening 62 in the ring 56 passes beneath the open bottom of the chute, a peach will fall through the opening and through the aligned opening 64 in the continuously rotating main turret disk 34 to a position as shown in Figure 3 on the stationary arcuate plate 78, the fruit being received between a pair of open clamps 86 and the rollers 201 and 203. The peach rolls or slides along arcuate plate 78 until it reaches the end thereof and rolls therefrom onto the orienting wheel 140 which, at that time, is positioned radially of the turret but is not yet in driving engagement with its driving spool 194. As this time the peach passes position 19—19, as illustrated in Figure 6. The orienting wheel does not contact its driving spool 194 until the wheel has passed the segment 216 (see Figure 6) after station 19—19 when it is tangential with the turret.

During this traverse of the turret the roller 140 is being positively driven. By reference to Figure 6 it will be seen that the outer arcuate rack 213 extends from the point 19—19 on such Figure 6 over to the cross line marked "Station B" on Figure 6, so that at any time the peach traverses this arc the two vertical rollers 201 and 203 will be positively driven and since they are in contact with the peach and since the center of the peach is to the right of a vertical line directly through the center of the axis of the roller 140, the vertical rolls 201 and 203 will be driving the peach eccentrically from points off center or laterally of the center of the peach which in turn is resting vertically downwardly on the rotating roller 140 but to the right of a vertical plane through the center of this roll. Thus the peach will be subjected to the combined influence of these three driving rolls. The vertical driving rolls tend to drive the peach in a horizontal plane and in a clockwise direction, and the orientating wheel 140 will tend to drive the peach in a vertical plane in a counterclockwise direction. The component of these two driving forces will therefore move the peach in a constantly shifting diagonal plane through the peach with respect to either set of rollers so that eventually, and rather quickly, the stem indent will be brought into contact with the orientating roll 140.

During this orientating operation the clamps 86 and 88 are spaced apart or open sufficiently so that they impose no substantial restriction on the free turning of the peach with the orientating wheel and the peach which is substantially entirely supported only by the orientating wheel but does lean against the two vertical rotating driving rollers 201 and 203. The clamp and rollers thereby serve during the orientating operation merely to contain the fruit on the wheel 140 and the driving rollers 201 and 203. The V-shaped retention jaws 86 cooperating with the opposed rollers 201 and 203 keep the peach not only in contact with the orientating wheel 140 but also in contact with the vertical driving rollers 201 and 203, the center of gravity of the peach being shifted to the right of the orientating wheel.

Just prior to the arrival of the orientating mechanism at position 19—19, the cam roller 110 passes a short cutout section 200 in the surface of the stationary control cam 112, as shown in Figure 2, and the clamps or grippers are momentarily closed to centralize the peach with respect to the orientating wheel and are then opened as the cam passes out of the notch 200 so that the peach is allowed freely to roll under the action of the orienting wheel, the clamps or grippers being spaced apart or opened sufficiently so that they impose no substantial restriction on the free turning of the peach with the orienting wheel and the peach is substantially entirely supported only by the orienting wheel. The clamps or grippers thereafter serve during the orienting operation merely to limit the tilting of the peach on the wheel and to prevent displacement of the peach out of driving engagement with the wheel. The V shape of the opposed clamps or grippers insures this correct centralizing of the peach on the orienting wheel.

The rotating orientating wheel causes the peach to rotate and if the indent is in the plane of the wheel, the indent will very quickly reach the wheel and the peach will therefore drop down on the wheel to the extent that the wheel penetrates into the stem indent. If the indent not only is in the plane of the wheel, but the suture plane also lies in the plane of the wheel, the peach will of course be very quickly turned so that not only does the wheel penetrate the stem indent, but is also aligned with the long axis thereof, and the wheel will accordingly penetrate farther into the stem indent. It is very important for this purpose that the wheel be relatively small in diameter as compared with the peach or like fruit to be oriented.

For orienting peaches the wheel should be approximately 1⅜ inches in diameter, ¼ inch in width and with an arcuate edge surface of 11/16 of an inch. Applicant has found that a wheel of that size is sufficiently large to rotate the peach and small enough so that when it enters the stem indent crosswise of its long axis, the steep sides of the indent crosswise of the long axis thereof will prevent further turning of the peach by the wheel 140 alone as the wheel 140 continues to rotate, however, in such a situation the rolls 201 and 203 continues to turn the peach. Furthermore, such a wheel is the proper size to enter deeply into the indent on a line with the long axis thereof, which coincides with the suture plane of the peach, so that the peach will not be further rotated as the rotation of the wheel continues after the suture plane or long axis of the stem indent registers or aligns with the long axis of the wheel.

By reference to Figures 14 and 15 it will be noticed that by reason of the curved surface 152 engaging the curved surface 232 of the circular track, the wheel 140 will remain in a fixed position with relation to the movement of the table. By reference to Figures 1, 2, 14 and 15 it will be seen that because the table is continuously turning and since the table carries the orientation spindles and the vertical orientation wheels, due to the curved surfaces 152 always contacting the stationary arcuate cam plates 232, the orientating wheels, as the turret turns, will turn bodily with the constantly rotating table so as constantly to shift the elongated axis of the wheel in the manner shown in Figure 2. The rotating wheels do not turn on their own spindles during this arcuate movement of the table from the position shown in Figure 2 at 19—19 continuously around to the point where the Geneva gear 148 engages the rack 218 to shift the orientating wheel vertically on its axis to a radial position as shown at the station C in Figure 2. These orientating wheels remain in a radial position with respect to the turret on further rotation. By reference to Figure 2 it will be seen that the rotating wheel 140 remains radial of the turret during its travel from position C to position D where the transfer of the peach to another mechanism is effected. It will be understood, of course, that when the rotating orientating wheel 140 is shifted to radial position this will mean that at this time it will have found the suture plane indent and will have lined up the suture plane indent to a point radial of the turret so that when the peach arrives at the station D the suture plane is likewise positioned radially of the turret. It is at the station D that the peach is transferred to other mechanism.

It will be further understood that between the positions B and C the vibrating mechanism 28, as hereinbefore described, will come into action to vibrate the peach and thereby cause the suture plane indent to exactly line up with the rotating orientating wheel 140 whereby correspondingly to properly seat the peach on the orientating wheel as to the suture plane indent or maximum depth of the orientating wheel.

Figure 18:
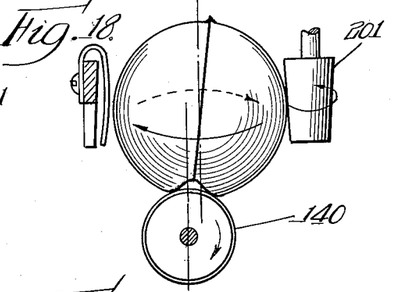

In accordance with the theory of operation of the present device, when a mass of peaches is dropped into the hopper and the turret has started to rotate, the peaches will run down, one by one, into the hopper 66 and drop through the opening 67 onto the arcuate plate 78 which extends only the length of the hopper. A single peach will fall into position between the opposed jaws 86 and 88 as shown in Figure 5, the jaws being open at this point so that the jaws are not gripping the peach. This is due to the action of the cam 112 against the roller 110 carried by one of the jaw members. In this position, as the turret continues to turn, the jaws are brought relatively together and the peach by this movement is forced from a position as shown in Figure 17 to a position wherein the vertical axis of the peach is brought over to one side, to-wit the right side of Figure 18, and against the rotating rolls 201 and 203. As shown in Figure 18, the center of gravity of the peach is shifted to one side of the center of gravity of the orientating roll 140. This peach, in addition, is urged in this position by means of the leaf spring 87. It will be understood, of course, that the orienting roll 140 is positively driven, as well as the vertical rolls 201 and 203. Both of these latter rolls are driven in the same direction and the orienting roll 140 is driven in a clockwise direction. The rolls 201 and 203 are driven in a counterclockwise direction. Upon continued rotation of the turret the orientating roll is shifted on a vertical axis from a radial position to a tangential position with respect to the circular peripheral plane of rotation of the turret. This is accomplished by the block segment 216 shown in Figure 6 contacting the Geneva mechanism 148 which controls the rotating of the stem axis of the orientating roll as shown in Figures 14 and 15. Thereafter upon the rotation of the turret the orientating wheel 140 continues to remain in this tangential position. In addition the clamping jaws remain relatively close to the surface of the peach but still will allow the peach to rotate freely upon the orientating wheel 140 and the rotating rolls 201 and 203. This action continues until the stem indent is turned downward and until the longitudinal axis of the axis of the stem indent aligns with the orientating wheel 140. In some instances the shorter axis of the stem indent may align with the rotating orientator wheel 140. When the longitudinal axis of the stem indent, which is the suture plane of the peach, lines up with the plane of action of the orientor wheel 140 the peach will then drop down sufficiently, due to the depth of the stem indent in this direction, in such manner that further rotation of the wheel 140 will have no turning effect upon the peach, and furthermore continued rotation of the rollers 201 and 203 will have no further turning effect upon the peach. On the other hand, in those instances where the shorter axis of the stem indent is first to align with the orientating wheel 140, continued rotation thereof and continued rotation of the rolls 201 and 203 will continue to turn the peach until the longitudinal axis of the stem indent does so align with the plane of rotation of the orientating wheel 140 as above described.

In some instances, where the longitudinal axis of the stem indent has aligned with the rotating orientating wheel 140 but certain minor protuberances or projections on the sides of the valley of the stem indent tend to prevent proper alignment, the vibration imparted by the mechanism hereinbefore described will tend to cause the sides of the stem indent valley to adjust themselves so that proper alignment of the longitudinal axis of the stem indent with the plane of rotation of the orientator wheel 140 will be effected.

After suture plane alignment has been effected, on the continued rotation of the turret, the zone of action will be reached wherein the orientating wheel 140 will be automatically turned to a position such that it is radial. This is at the discharge zone of the turret. In so turning to a radial position, due to the fact that the wheel 140 is in the deep stem indent, which is the suture plane indent, it will likewise turn the peach with the wheel to this radial position. After this occurs the jaws are automatically closed to clamp the peach and bring the suture plane of the peach in direct alignment centrally of the jaws. This will show a shift of the peach from the position shown in Figure 21 to the position shown in Figure 22 where the suture plane is in direct alignment with the plane of rotation of the orienting wheel 140. The next action which takes place is that an impaling blade or other transfer device will then move into contact with the suture plane portion of the peach thus oriented which is radial of the turret, will pierce the periphery of the peach and from then on the impaling blade is used as a transfer device for transferring the thus oriented peach to another machine or to a continuation machine wherein peach halving or sawing and pitting and the like are carried out with the properly oriented peach, it being understood, of course, that the halving or sawing blade will lie directly in the suture plane of the peach as thus oriented.

Figure 19:
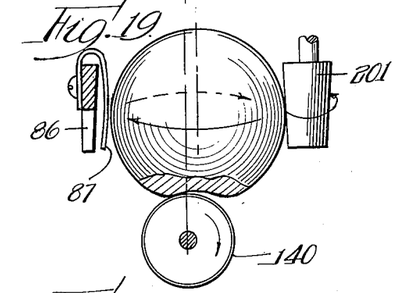

Reference is made to Figures 17 and 19 of the drawings wherein the rotatable rolls 201 and 203 and the feed jaw are shown as tapered from top to bottom to prevent the peach from having a tendency to jump out of the turret. These inclined surfaces urge or force the peach downwardly into contact with the rotating wheel and the rolls.

With reference to Figure 6, the guide track 210 is constructed and arranged to permit the orientating assembly 158 to pivot about the axis 168, see Figure 8, and drop down out of the path of the transfer mechanism or blade T, as shown in Figure 1. The guide track 210 is bent inwardly at 210a to permit the roller 233 to follow the bent portion of the track 210a and permit the pivoting of the orientating mechanism out of the way of the path of travel of the transfer blade T during the continued rotative movement of the turret.

The peaches are dumped or delivered into the hopper or chute 68 and roll down the chute, passing from the chute onto the surface of the continuously rotating ring 56, the same being spaced above the main turret 34, Figs. 1, 2 and 4, the peaches being confined against any substantial arcuate movement by the upstanding side walls 70, 72, 74 and 76 of the hopper. As each opening in the ring 56 passes beneath the open bottom of the chute, a peach will fall through the opening and through the aligned opening 64 in the continuously rotating main turret disk or support 34 to a position as shown in Fig. 3 on the stationary arcuate plate 78, the fruit being received between the clamp 86 and the clamp 88 carrying the rollers 201. These clamps 86 and 88 have the function of maintaining the peach on the underlying orienting wheel. The peach rolls or slides along the arcuate plate 78 until it reaches the end thereof and rolls therefrom onto the orienting wheel 140 which, at that time, is positioned radially of the turret and out of driving engagement with its driving spool or means 194. The clamp 86 pushes the peach along the arcuate plate, the light spring 87 being compressed by the inertia of the peach and as the peach reaches the end of the arcuate plate 78 the clamp or centering means pushes it off and the peach falls on the orienting wheel under a force impelling it toward the orienting rollers 201. The spring 87 acts to give the peach a kick to assure that the peach will fall on the wheel 140 with its center of gravity between the vertical plane through the center of the orienting wheel 140 and the orienting rollers 201. Just after the peach falls on the orienting wheel the spindle 154 engages a cam block 196 which raises the spindle and at the same time the toothed wheel 148 engages the teeth of the segment 216, Fig. 6, so that the wheel is turned to a position normal to a radius through the center of the orienting wheel 140 and the center of rotation of the turret 134, as shown in Fig. 2. The peach is now positioned, as shown in Fig. 17, so that it is in engagement with the additional peach turning means comprising orienting rollers 201 and the orienting wheel 140 and out of engagement with the clamp 86 and the light spring 87.

Figure 20:
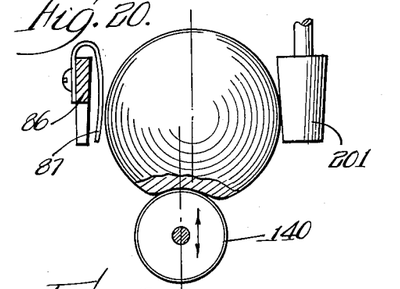

Hence, substantially the entire weight of the peach is supported on the orienting wheel 140 and is tilted toward and engages the surfaces of the peach rotating rollers 201. The tapered surfaces of the orienting rollers 201 apply a downward force on the peach tending to prevent bouncing of the peach as it is rotated by the orienting wheel 140 around a horizontal axis parallel to its own axis of rotation. As indicated in Fig. 17, the peach rotating rollers 201 and 203 tend to rotate the peach about a vertical axis or an axis transverse to the axis of the orienting wheel 140, consequently by reason of these two forces of rotation the peach is given a simultaneous motion about two axes which are normal or angularly related to each other. This latter motion of the peach is continued until the stem indent reaches the orienting wheel 140, when the peach drops down on the wheel to the extent that the wheel may penetrate into the stem indent. If the suture plane of the peach or long axis of the stem indent of the peach happens to lie in the plane of the wheel, the peach will of course settle down to a greater extent and the wheel will of course penetrate the indent to a greater or maximum depth. If the wheel happens to engage in the indent crosswise of the suture plane, the steep sides of the indent crosswise of the suture plane will prevent further turning of the peach by the orienting wheel 140. Thereafter the only component of motion imparted to the peach will be that about a vertical axis caused by the continued rotation of the rolls 201 and 203. Hence the peach will be turned relative to the orienting wheel 140 and about such vertical axis until the suture plane is aligned with the wheel and the peach drops down to the full extent permitted by the depth of the indent of the suture plane thereof. As shown in Fig. 19 of the drawings, the orienting wheel 140 has located the stem indent and extends therein crosswise of the suture plane. As there indicated, the only component of motion imparted to the fruit is by the rollers 201 and about a vertical axis. Thereafter, as shown in Fig. 20, the peach has been turned by the rollers 201 relative to the plane of the orienting wheel so that the suture plane of the peach lines up with the suture plane of the wheel so that the peach drops further down on the wheel with the suture plane of the peach coincident with the plane of the wheel. This all takes place as the peach is being continuously moved along by the turret 134.

As the turret rotates between station 19 and station B, the wheel remains positioned in a plane normal to a radius of the turret and between these two stations ample opportunity is afforded for the orientation of the suture plane of the peach. Accordingly, approximately at station 23, the segmental rack 213 which serves through the gear 211 to rotate the orienting rollers 201, terminates, and the rollers accordingly cease to turn.

Figures 21, 22, 23:
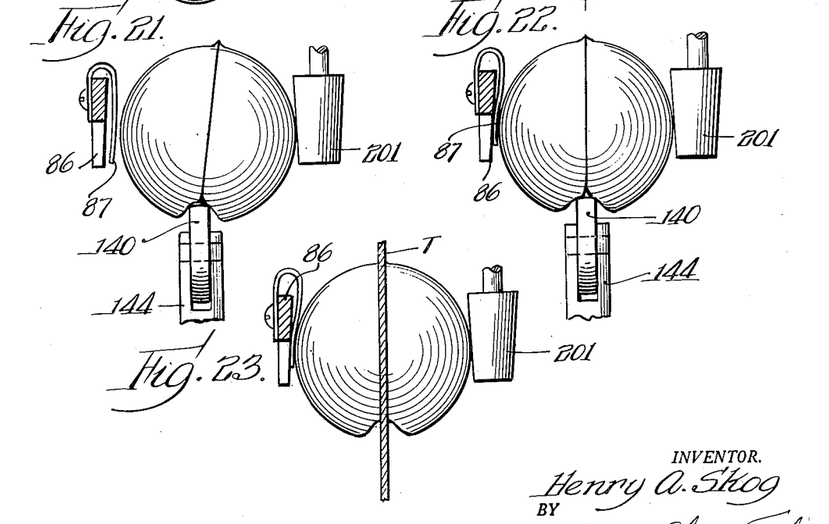

It may happen that because the stem indents of peaches or like fruit are not perfectly smooth, but grooves are left from stems or twigs that bore the fruit and the sides of the indents have creases and bumps, the wheel has not entered the stem indent in the suture plane to its fullest position and therefore the suture plane has not been precisely oriented by the time the fruit reaches and passes station 23. Accordingly, as the turret continues to revolve, the orienting mechanism passes onto and over the ring sector 242, Fig. 6, the wheel spindle passing over the cam block section 270 at the end of the ring 203 onto the track section 242, which is elevated with respect to the ring 203. Thus, as the orienting wheel passes over the sector 242, the orienting wheel spindle is held in raised position and therefore out of driving engagement with its driving spool 194, the track section being continuously vibrated through a distance adjustable from almost nothing to one-eighth of an inch. The wheel spindle and hence the peach are vibrated vertically on the order of 1320 vibrations per minute, but with rather a smooth movement, and the wheel clears the bumps, creases, and roughened surfaces on the sides of the indent of the peach, and the peach settles down on the wheel so that the wheel penetrates the maximum possible extent into the indent of the peach. The long axis or suture plane of the peach is thus precisely located by the wheel. Means is here provided for turning the orienting wheel angularly while in the suture plane indent to turn the peach bodily to place the suture plane in a predetermined plane for transfer and halving through its suture plane, i.e. the saw is located in said plane. As the orienting mechanism passes from the track section 242 it passes onto a short arcuate track section (A in Fig. 6), which is of the same elevation as the track section 242, and in moving thereon the toothed wheel 142 engages the toothed segment 218 and the orienting wheel 140 is caused to swing through an angle of 90 degrees to line up the suture plane of the peach with the plane of action of the transfer means and the plane of operation of the saw or halving means, so that the orienting wheel and the suture plane of the peach is positioned in a radial plane to the axis of the turret, as indicated at C in Fig. 2. The orienting mechanism now approaches the transfer position and as it approaches this position the cam roller 110 of this mechanism reaches the cut-out portion 272 of the control cam 112 and the fruit grippers or clamps are thereupon closed by spring action. As shown in Fig. 21, when the peach rests on the wheel with the wheel extending into the stem indent along the suture plane of the peach and before the grippers or clamps are closed, the peach tilts toward and engages the now stationary rollers 201. As the clamps or grippers close they centralize the peach with respect to the wheel so that its suture plane extends vertically coincident with the plane of the orienting wheel, as shown in Fig. 22. The tapered inner surface of the fruit gripper 86 and the tapered surfaces of the rollers 201 serve to apply to the peach, as the grippers are moved to closed position, a force exerted in a downward direction from above the center line of the greatest diameter of the peach, thereby insuring that the peach will be maintained in properly oriented position on the wheel and will not be lifted off the wheel or shifted with respect thereto as the grippers move to closed position.

At the transfer station, the transfer blade T or a pair of clamp jaws swings down through the fruit receiving openings in the main turret disk and the overlying turret disk and impales the peach or grasps the peach. By a suitable mechanism, not shown, this transfer blade moves arcuately with the turret from the position shown at D in Fig. 2 to the position marked E in said figure. As the orienting mechanism moves from position D to position E, the guide roller 233 at the bottom of the orienting wheel spindle 154 passes beyond the end of the guide track 210, Figs. 6 and 8, and the weight of the orienting wheel and the frame on which it is mounted causes the orienting wheel to swing downwardly about the pivot studs attaching the bracket 162 to the bracket arms 160. The transfer blade A thus continuing to swing downwardly while moving arcuately with the turret, carries the peach downwardly away from and out of the orienting turret for transfer to a further processing machine or device. The orienting mechanism remains in lowered position until the roller 233 at the bottom of its spindle approaches the track section 210a and as it moves around that track section the track section causes it to be elevated before it reaches a position below the end of the arcuate peach receiving plate 78.

It is apparent that many widely different embodiments of this invention may be made without departing from the spirit and scope thereof, and therefore it is not intended to be limited except as indicated in the appended claims.

Having thus described the invention, what I claim as new and desire to secure by Letters Patent is:

1. In a device for orienting the suture plane of a peach, the combination of an orientation sensing member having an elongated peach contacting surface shaped substantially to conform to and to enter the stem indent of the peach to a maximum extent when the plane of said elongated peach contacting surface registers with the long axis of said stem indent, means for supporting a whole peach above said surface and for turning the peach while so supported relative to said elongated peach contacting surface to cause the plane of said elongated peach contacting surface to register with the long axis of the stem indent of the peach, and means for causing said elongated peach contacting surface to project into said stem indent to its maximum degree of penetration when in such registration with the long axis of the stem indent of the peach.

2. In a device for orienting the suture plane of a peach, the combination of a substantially circular rotatable member adapted to engage a peach positioned thereover and having a periphery shaped substantially to conform to and enter the contour of the long axis of the stem indent of a peach to maximum extent when the plane of said rotatable member registers with said long axis of said indent, means for rotating said member, additional rotatable means positioned to contact the periphery of the peach while engaged by said first mentioned rotatable member, and means for rotating said additional rotatable means to turn said peach relative to said rotatable member to a position such that the long axis of said stem indent registers with the plane of said rotatable member and said member penetrates to the maximum extent into said stem indent.

3. In a device for orienting a peach as to its suture plane, as set forth in claim 2, wherein said additional rotatable means include a tapered roll contacting the periphery of the peach in spaced relation to said rotatable member.

4. In a device for orienting the suture plane of a peach, the combination of a continuously movable support carrying a series of peach receivers including spaced apart rotatable orienting wheels, means operative during the movement of said support for feeding a peach to said receivers and onto each orienting wheel, means for rotating each orienting wheel during a prolonged portion of its travel with said support, additional peach turning means cooperating with each said wheel simultaneously to apply to the peach turning forces tending to turn the peach about two axes to cause the rotating wheel to enter the suture plane of the peach, and means for thereafter turning the wheel and peach together to place the suture plane in a predetermined plane with respect to the moving support.

5. In a peach orienting device, a continuously movable support, an orienting wheel movable with said support, a peach receiving member relatively to which the wheel moves with said support, peach centering means shiftably mounted on said support for centering the peach on the orienting wheel, said peach centering means including spaced apart members movable relatively to said peach receiving member, means for delivering peaches individually to said peach receiving member in position between said pair of said fruit centering members, one of said fruit centering members comprising peach rotating means for rotating the peach about an axis angularly disposed with respect to the axis of rotation of said orienting wheel.

6. In a peach orienting device, a continuously movable support, an orienting wheel movable with said support, a peach receiving member relatively to which the wheel moves with said support, peach centering means shiftably mounted on said moving support for centering the peach on the orienting wheel, said peach centering means including spaced apart members movable relatively to said peach receiving member, means for delivering peaches individually to said peach receiving member and between said pair of said fruit centering members, one of said fruit centering members comprising peach rotating means for rotating the peach about an axis disposed angularly with respect to the axis of rotation of said orienting wheel, said peach rotating means being mounted on said support to move in advance of the peach between said centering members.

7. In a peach orienting device, a continuously movable support, an orienting wheel movable with said support, a peach receiving member relatively to which the wheel moves with said support, peach centering means shiftably mounted on said support for centering the peach on the orienting wheel, said peach centering means including spaced apart members movable relatively to said peach receiving member, means for delivering peaches individually to said peach receiving member and between said pair of said fruit centering members, one of said fruit centering members comprising peach rotating means for rotating the peach about an axis angularly disposed with respect to the axis of rotation of said orienting wheel, said peach rotating means being mounted on said support to move in advance of the peach between said centering members, said other centering member being positioned and operative to move the peach along the stationary peach receiving member into contact with said peach rotating means.

8. In a peach orienting device, a continuously movable support, an orienting wheel movable with said support, a peach receiving member relative to which the wheel moves with said support, peach centering means shiftably mounted on said support for centering the peach on the orienting wheel, said peach centering means including spaced apart members movable relatively to said peach receiving member, means for delivering peaches individually to said peach receiving member and between a pair of said fruit centering members, one of said fruit centering members comprising peach rotating means for rotating the peach about an axis angularly disposed with respect to the axis of rotation of said orienting wheel, said peach rotating means being mounted on said support to move in advance of the peach between said centering members, said other centering member including spring means for projecting the peach onto the orienting wheel and into engagement with the peach rotating means of the opposite centering member and out of contact with said projecting means.

9. In a peach orienting device, a continuously movable support, an orienting wheel movable with said support, a peach receiving member relatively to which the wheel moves with said support, peach centering means shiftably mounted on said support for centering the peach on the orienting wheel, said peach centering means including spaced apart members movable relatively to said peach receiving member, means for delivering peaches individually to said peach receiving member and between a pair of said fruit centering members, one of said fruit centering members comprising peach rotating means for rotating the peach about an axis angularly disposed with respect to the axis of rotation of said orienting wheel, said peach rotating means being mounted on said support to move in advance of the peach between said centering members, said other centering member being positioned to move the peach from the peach receiving member onto an orienting wheel, said other centering member including spring means for projecting the peach into engagement with the peach rotating means of the opposite centering member and out of contact with said projecting means, and means for moving said centering members toward each other into contact with the oriented peach to center the suture plane of the peach in the plane of the wheel to vertically align the suture plane of the peach with the plane of the wheel.

10. In an orienting device, a driven rotatable wheel for supporting a peach to be orientated, rotatable rolls disposed on opposite sides of the wheel plane with their nearest confronting surfaces disposed in spaced relation to a projection of the wheel plane, means for positioning a fruit to be oriented in contact with the wheel and also in contact with the rotating rolls, means for rotating the rolls to rotate the peach relative to the wheel, said wheel having a periphery shaped to enter the indent of the peach along its long axis to a maximum extent when the suture plane of the peach lies in the wheel plane.

11. In a peach orienting device, peach supporting and orienting means comprising a driven rotating wheel for supporting the peach to be oriented, a pair of rotating rolls mounted for rotation about substantially parallel axes spaced from the plane of the wheel and means for rotating said rolls to turn the peach relative to the orienting wheel, the wheel being shaped to enter the stem indent along its long axis when the suture plane of the peach is aligned with the wheel plane.

12. In a peach orienting device, means for simultaneously applying to the peach turning forces tending to turn the peach about two axes, said means including a driven rotatable wheel having an elongated periphery shaped to enter the long axis of the stem indent to maximum extent when the suture plane of the peach is aligned with the wheel periphery, and means for positioning a fruit to be oriented in contact with said force applying means.

13. In a machine for orienting the suture plane of a whole peach the combination of a plurality of rotatable members rotating about angularly disposed axes, one of said members having a peripheral portion shaped to the contour of the long axis of the stem indent of the peach, means for positioning a whole peach into contact with said plurality of rotatable members, and means for rotating all of said rotatable members when in contact with the peach to apply to the peach turning forces tending to turn the peach about two axes to cause the suture plane indent of the peach to line up with the peripheral portion of the turning member that is correspondingly shaped.

14. In a peach orienting device, a peach supporting and orienting means comprising a plurality of spaced apart members having rolling contact with the peach at spaced points, means for rotating all of said members simultaneously to apply to the peach turning forces tending to turn the peach about two axes, one of said members being shaped to enter the stem indent of the peach along a predetermined plane whereby to orient the suture plane of the peach.

15. In a device for orienting peaches, peach supporting and rotating means comprising a driven rotatable wheel having a peripheral cross section shaped to correspond to the contour of the structure plane indent of a peach, and a pair of rotatable rolls adapted to engage the periphery of a peach in spaced relation to the wheel and above the plane of contact of the wheel with the peach.

16. In a device for orienting peaches, peach supporting and rotating means comprising a rotatable wheel having a peripheral cross section shaped to correspond to the contour of the suture plane indent of a peach, means for maintaining the peach in superimposed relation upon said wheel comprising a pair of rotating rolls contacting the peach substantially in a horizontal plane through the center of the peach, and means for rotating said wheel and said last mentioned rolls.

17. An orientator for a whole peach comprising an orientator member having an elongated surface shaped to enter the stem indent of the peach along the long axis thereof, means for supporting a whole peach on the orientator member, said means providing movable spaced peach engaging surfaces spaced sufficient equal distances from said member so that said whole peach may be supported partly on said elongated surface of said member and partly on said movable spaced surfaces with the center of gravity of said whole peach lying between the point of contact of said peach with said member and the points of contact of said peach with said spaced peach engaging surfaces, and means for moving said peach engaging surfaces to turn the peach into an oriented position of registration of the long axis of the indent with said member.

18. In a device of the class described, peach supporting and orienting means comprising an orienting wheel having a peripheral cross section shaped to enter the stem indent of a peach, power means for rotating said wheel about a horizontal axis, means for supporting a whole peach on said wheel including a plurality of spaced rotatable members disposed laterally of the center of gravity of said peach a sufficient distance so that a peach when supported on said orienting wheel will lean against said rotatable members, and means for rotating said rotatable members about axes disposed substantially normal to the axis of rotation of said wheel so as to impart a turning movement to said peach in a direction angularly disposed with respect to the direction said wheel tends to turn said peach.

19. In a device of the class described, peach supporting and orienting means comprising three spaced driven rotatable means, means for mounting said rotatable means in spaced relation to support a whole peach thereon, one of said rotatable means being shaped to enter the stem indent of said peach when the stem indent thereof registers with said so shaped rotatable means, and mechanism for turning certain of said rotatable means to turn the peach to cause such registration.

20. In a device of the class described, peach supporting and orienting means comprising three spaced driven rotatable means, means for mounting said rotatable means in spaced relation to support a whole peach thereon, one of said rotatable means being shaped to enter the stem indent of said peach when the stem indent thereof registers with said so shaped rotatable means, and mechanism for turning a plurality of said rotatable means to turn the peach to cause such registration.

21. In a device of the class described, peach supporting and orienting means comprising three spaced rotatable means, means for mounting said rotatable means in spaced relation to support a whole peach thereon, one of said rotatable means being shaped to enter the stem indent of said peach when the stem indent thereof registers with said so shaped rotatable means, and mechanism for turning all of said rotatable means to turn the peach to cause such registration.

22. Means for orientating indented fruit comprising means for progressing a fruit over a path, means for rotating a fruit in vertical planes while being progressed, and separate means tending to simultaneously rotate said fruit in horizontal planes.

23. Means for orientating elongated indented fruit comprising means for transporting said fruit, rotating means contacting the bottom of said fruit while being transported to rotate said fruit in vertical planes, and separate means tending to simultaneously rotate said fruit in horizontal planes.

24. Apparatus in accordance with claim 23 wherein said rotating means contacting the bottom of said fruit is shaped to enter the stem indent of said fruit when registry of said latter rotating means and said indent occurs.

25. Means for orientating elongated indented fruit comprising means for progressing said fruit, rotating means contacting the bottom of said fruit to rotate said fruit in a vertical plane while being progressed, and separate means for contacting a side of said fruit tending to simultaneously rotate the fruit in a horizontal plane.

26. Means for orientating indented fruit comprising a wheel mounted to be rotatable in a vertical plane, fruit supported position to maintain a fruit with at least part of the weight of said fruit on said wheel, means for progressing said support and wheel together over a path, means for rotating said wheel to rotate said fruit, and separate means acting on said fruit while being progressed and rotated by said wheel positioned to act on said fruit to rotate said fruit in planes other than the plane of said wheel.

References Cited in the file of this patent

UNITED STATES PATENTS

| | | |
|---|---|---|
| 1,742,653 | Goranson | Jan. 7, 1930 |
| 2,106,997 | Fenner | Feb. 1, 1938 |
| 2,193,353 | Thompson | Mar. 12, 1940 |
| 2,220,511 | Carroll | Nov. 5, 1940 |
| 2,232,209 | Carroll | Feb. 18, 1941 |
| 2,238,970 | Carroll | Apr. 22, 1941 |
| 2,265,515 | Carroll | Dec. 9, 1941 |
| 2,308,039 | Ashlock | Jan. 12, 1943 |
| 2,343,496 | Carroll | Mar. 7, 1944 |
| 2,387,709 | Ashlock | Oct. 30, 1945 |
| 2,406,311 | Ashlock | Aug. 27, 1946 |
| 2,923,396 | Hait | Feb. 2, 1960 |

UNITED STATES PATENT OFFICE
CERTIFICATE OF CORRECTION

Patent No. 2,980,232 April 18, 1961

Henry A. Skog

It is hereby certified that error appears in the above numbered patent requiring correction and that the said Letters Patent should read as corrected below.

Column 15, line 57, for "structure" read -- suture --.

Signed and sealed this 12th day of September 1961.

(SEAL)
Attest:

ERNEST W. SWIDER
Attesting Officer

DAVID L. LADD
Commissioner of Patents

USCOMM-DC